United States Patent
Wesslén et al.

(10) Patent No.: US 11,836,488 B2
(45) Date of Patent: Dec. 5, 2023

(54) ACCELERATOR CONTROLLER FOR INSERTING TEMPLATE MICROCODE INSTRUCTIONS INTO A MICROCODE BUFFER TO ACCELERATE MATRIX OPERATIONS

(71) Applicant: Telefonaktiebolaget LM Ericsson (publ), Stockholm (SE)

(72) Inventors: Anders Wesslén, Staffanstorp (SE); Michael Breschel, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/758,129

(22) PCT Filed: Jan. 13, 2020

(86) PCT No.: PCT/SE2020/050020
§ 371 (c)(1),
(2) Date: Jun. 28, 2022

(87) PCT Pub. No.: WO2021/145803
PCT Pub. Date: Jul. 22, 2021

(65) Prior Publication Data
US 2023/0038919 A1 Feb. 9, 2023

(51) Int. Cl.
*G06F 9/26* (2006.01)
*G06F 7/16* (2006.01)

(52) U.S. Cl.
CPC .............. *G06F 9/267* (2013.01); *G06F 7/16* (2013.01); *G06F 9/268* (2013.01)

(58) Field of Classification Search
CPC ........... G06F 9/267; G06F 9/268; G06F 17/16
See application file for complete search history.

(56) References Cited

U.S. PATENT DOCUMENTS

| 5,276,822 A | 1/1994 | Maekawa et al. |
| 5,784,636 A | 7/1998 | Rupp |

(Continued)

FOREIGN PATENT DOCUMENTS

| EP | 3343359 A1 | 7/2018 |
| WO | 9953439 A2 | 10/1999 |

(Continued)

OTHER PUBLICATIONS

International Search Report and Written Opinion for Application No. PCT/SE2020/050020, dated Dec. 1, 2020, 13 pages.

(Continued)

*Primary Examiner* — Jacob Petranek
(74) *Attorney, Agent, or Firm* — Nicholson De Vos Webster & Elliott LLP

(57) ABSTRACT

A method for a controller to execute a program comprising a sequence of functions on an accelerator with a pipelined architecture comprising a microcode buffer. The method comprises executing a function of the program as a sequence of operations, wherein the sequence of operations is represented by a sequence of templates, determining whether the template is non-colliding with previously inserted templates in the microcode buffer, determining whether data in local memory will be referenced before all previously inserted templates have taken effect, determining whether registers will be referenced before all previously inserted templates in the microcode buffer have taken effect, when it is determined that the template fits, that resources are available, that local data memory accesses will not collide, and that register accesses will not collide: creating a sequence of microcode instructions in the template, and inserting the template into the microcode buffer.

20 Claims, 10 Drawing Sheets

(56) References Cited

U.S. PATENT DOCUMENTS

| | | | |
|---|---|---|---|
| 6,192,466 B1 | 2/2001 | Gschwind | |
| 2001/0049781 A1 | 12/2001 | Miyake et al. | |
| 2003/0221091 A1* | 11/2003 | Henry | G06F 9/30189 |
| | | | 712/E9.035 |
| 2004/0054868 A1* | 3/2004 | Parthasarathy | G06F 9/30145 |
| | | | 712/E9.06 |
| 2007/0198812 A1* | 8/2007 | Abernathy | G06F 9/3836 |
| | | | 712/214 |
| 2008/0141012 A1* | 6/2008 | Yehia | G06F 9/30032 |
| | | | 712/226 |
| 2009/0282221 A1* | 11/2009 | Heil | G06F 9/3885 |
| | | | 712/214 |
| 2016/0202980 A1* | 7/2016 | Henry | G06F 12/0875 |
| | | | 712/213 |

FOREIGN PATENT DOCUMENTS

| | | |
|---|---|---|
| WO | 2018140140 A1 | 8/2018 |
| WO | 2019190538 A1 | 10/2019 |

OTHER PUBLICATIONS

International Preliminary Report on Patentability, PCT App. No. PCT/SE2020/050020, dated Jul. 28, 2022, 10 pages.
Supplementary European Search Report and Search Opinion, EP App. No. 20913888.2, dated Dec. 19, 2022, 10 pages.
Communication pursuant to Article 94(3) EPC, EP App. No. 20913888.2, dated Aug. 2, 2023, 5 pages.

\* cited by examiner

ACCELERATOR CONTROLLER FOR INSERTING TEMPLATE MICROCODE INSTRUCTIONS INTO A MICROCODE BUFFER TO ACCELERATE MATRIX OPERATIONS

CROSS-REFERENCE TO RELATED APPLICATIONS

This application is a National stage of International Application No. PCT/SE2020/050020, filed Jan. 13, 2020, which is hereby incorporated by reference.

TECHNICAL FIELD

The present disclosure relates generally to the field of programmable controllers. More particularly, it relates to a programmable controller configured to execute a program comprising a sequence of functions on an accelerator with a pipelined architecture comprising a microcode buffer.

BACKGROUND

Weight calculation for beamforming in an Advanced Antenna System (AAS) is often expressed with matrices as incoming entities.

It is known that weight calculation for beamforming may be implemented in software on a Digital Signal Processor (DSP).

A drawback of software implemented weight calculation is that the software implementation will be limited by DSP memory size and number of DSPs available to handle large matrices and/or advanced algorithms.

Therefore, there is a need for alternative approaches for functions expressed with matrix operations.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other drawbacks.

According to a first aspect, this is achieved by a method for a controller configured to execute a program comprising a sequence of functions on an accelerator with a pipelined architecture comprising a microcode buffer, wherein the controller is programmable with the sequence of functions, wherein each function comprises a sequence of operations, and wherein each operation is represented by a template comprising a sequence of microcode instructions to be executed during a set of clock cycles for utilization of available resources in the accelerator.

The method comprises steps being performed by the controller.

The method comprises executing a function of the program as a sequence of operations, wherein the sequence of operations is represented by a sequence of templates comprising microcode instructions, wherein the microcode instructions specify addresses, registers, and timing requirements related to each operation in the sequence of operations.

The method further comprises determining, based on the microcode instructions in the template whether the template is non-colliding with previously inserted templates in the microcode buffer to solve resource dependencies; determining, based on the microcode instructions in the template specifying addresses, whether data in local memory will be referenced before all previously inserted templates have taken effect to solve data dependencies; and determining, based on the microcode instructions in the template specifying registers, whether registers will be referenced before all previously inserted templates in the microcode buffer have taken effect to solve register dependencies.

The method furthermore comprises, when it is determined that the template fits, that resources are available, that local data memory accesses will not collide, and that register accesses will not collide, creating a sequence of microcode instructions in the template fulfilling the timing requirements on the fly; and inserting the template into the microcode buffer for execution of the created sequence of microcode instructions in the template, wherein the template comprises sequences of microcode instructions where each microcode instruction comprises instructions for one clock cycle.

In some embodiments, the method further comprises packing the created sequence of templates for utilization of available resources in the accelerator.

In some embodiments, the method further comprises shifting the microcode buffer up for a next clock cycle when a first instruction in the microcode buffer is sent to the accelerator.

In some embodiments, a depth of the microcode buffer is determined by the largest template size.

In some embodiments, the method further comprises queueing the templates for insertion into the microcode buffer until dependencies have been solved.

In some embodiments, the method further comprises selecting the templates depending on the operations to be executed.

In some embodiments, the sequence of operations comprises matrix operations.

In some embodiments, the accelerator comprises a matrix of processing elements wherein each processing element operates based on several data inputs and provides one data output in the result of the matrix.

In some embodiments, the accelerator is a hardware accelerator programmable with a sequence of operations.

In some embodiments, the hardware accelerator comprises a matrix accelerator which is programmable with a sequence of matrix operations.

In some embodiments, the matrix accelerator comprises a matrix of processing elements wherein each processing element further comprises a core of a set of multipliers followed by an adder tree and accumulator, and wherein the core is implemented as a pipeline.

In some embodiments, each step in the pipeline is performed during one clock cycle.

In some embodiments, the accelerator is for accelerating operations for weight calculation for beamforming in an advanced antenna system.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an arrangement for a controller configured to execute a program comprising a sequence of functions on an accelerator with a pipelined architecture comprising a microcode buffer, wherein the controller is programmable with the sequence of functions, wherein each function comprises a sequence of operations, and wherein each operation is represented by a template comprising a sequence of microcode instructions to be executed during a set of clock cycles for utilization of available resources in the accelerator.

The arrangement comprises the controller being configured to cause execution of a function of the program as a sequence of operations, wherein the sequence of operations is represented by a sequence of templates comprising microcode instructions, wherein the microcode instructions specify addresses, registers, and timing requirements related to each operation in the sequence of operations.

The controller being further configured to cause determination of, based on the microcode instructions in the template, whether the template is non-colliding with previously inserted templates in the microcode buffer to solve resource dependencies; determination of, based on the microcode instructions in the template specifying addresses, whether data in local memory will be referenced before all previously inserted templates in the microcode buffer have taken effect to solve data dependencies; and determination of, based on the microcode instructions in the template specifying registers, whether registers will be referenced before all by previously inserted templates in the microcode buffer have taken effect to solve register dependencies.

The controller being furthermore configured to cause, responsive to determination that the template fits, that resources are available, that local data memory accesses will not collide, and that register accesses will not collide, creation of a sequence of microcode instructions in the template fulfilling the timing requirements on the fly; and insertion of the template into the microcode buffer for execution of the created sequence of microcode instructions in the template, wherein the template comprises sequences of microcode instructions where each microcode instruction comprises instructions for one clock cycle.

A fourth aspect is a hardware accelerator with a pipelined architecture comprising a microcode buffer and the arrangement according to the third aspect.

A fifth aspect is a system comprising the arrangement according to the third aspect and/or the hardware accelerator according to the fourth aspect.

Any of the above aspects may additionally have features identical with or corresponding to any of the various features as explained above for any of the other aspects.

An advantage of some embodiments is that alternative approaches for functions expressed with matrix operations are provided.

Another advantage of some embodiments is that large matrices and/or advanced algorithms may be handled in contrast to what is possible according to prior art approaches.

Yet an advantage of some embodiments is that matrix operations are accelerated in relation to what is possible according to prior art approaches.

Yet an advantage of some embodiments is that the implementation is more efficient in utilizing available resources in the accelerator compared to what is possible according to prior art approaches.

Yet an advantage of some embodiments is that the accelerator may implement different operations in contrast to what is possible according to prior art approaches.

Yet an advantage of some embodiments is that the controller is independent on specific pipeline timings of the accelerator and may handle complex functions with a plurality of microcode instructions with different timings.

Yet another advantage of some embodiments is that the controller may be enabled to interleave different functions where possible.

It should be noted that, even if embodiments are described herein in the context of weight calculation for beamforming, some embodiments may be equally applicable and/or beneficial also in other contexts.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, a drawback of software implemented weight calculation is that the software implementation will be limited by DSP memory size and number of DSPs available to handle large matrices and/or advanced algorithms.

In the following, embodiments will be presented where alternative approaches for functions expressed with matrix operations are described.

It should be noted that, even if embodiments are described herein in the context of a controller configured to execute a program comprising a sequence of functions on an accelerator with a pipelined architecture comprising a microcode buffer, wherein the controller is programmable with the sequence of functions, wherein each function comprises a sequence of operations, and wherein each operation is represented by a template comprising a sequence of microcode instructions to be executed during a set of clock cycles for utilization of available resources in the accelerator, some embodiments may be equally applicable and/or beneficial also in other contexts wherein functions are expressed with matrix operations.

A controller, as described herein, typically comprises a programmable controller configured to execute a program on a hardware accelerator that implements different operations and which is generic and independent of the specific hardware accelerated functions, timings, and architecture.

An accelerator, as described herein, typically comprises a hardware accelerator with a pipelined architecture comprising a microcode buffer, wherein the hardware accelerator is configured for performing functions more efficiently than in software on a DSP.

A program, as described herein, typically comprises a sequence of functions, wherein each function comprises a sequence of operations.

A template, as described herein, typically comprises a sequence of microcode instructions to be executed during a set of clock cycles and represents one or more operations.

Figure 1:
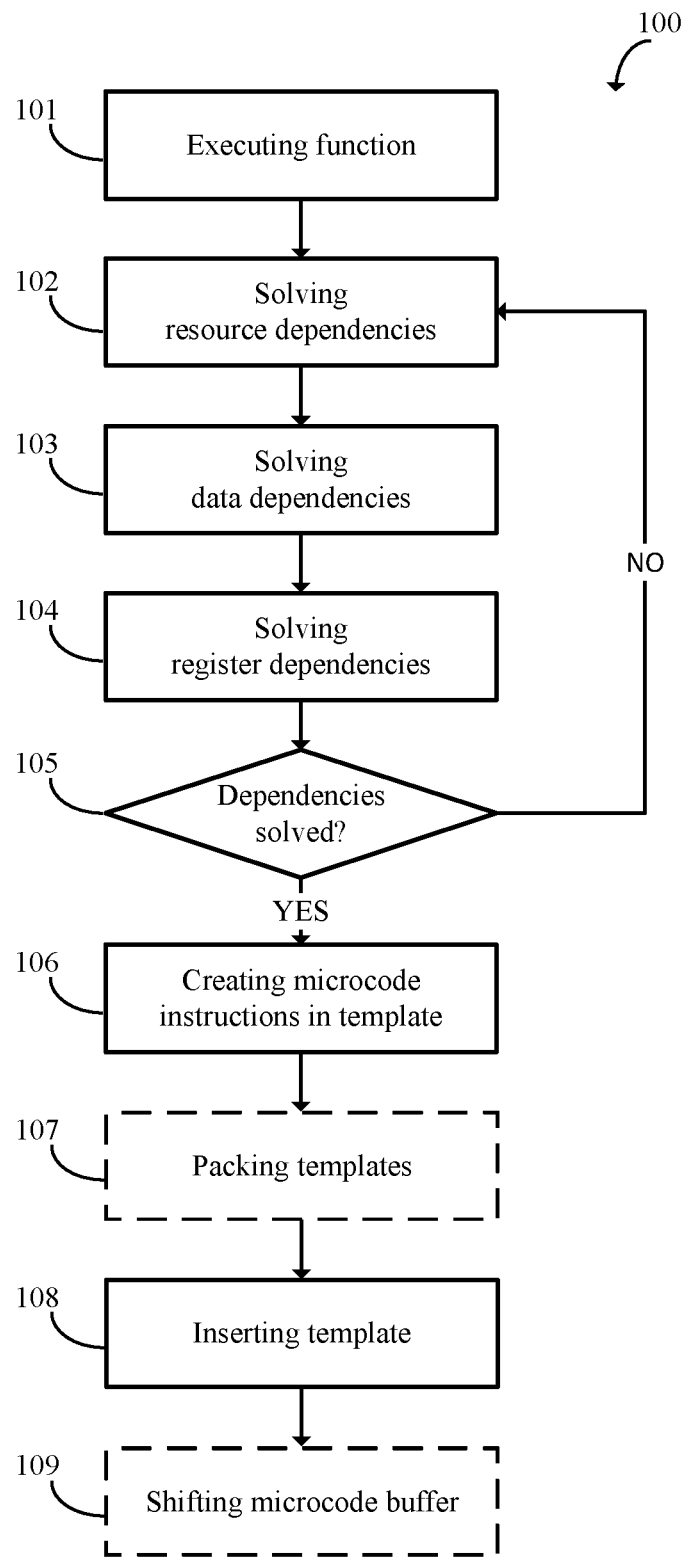
FIG. 1 is a flowchart illustrating example method steps according to some embodiments.

FIG. 1 is a flowchart illustrating method steps of an example controller method 100 according to some embodiments. The controller method 100 is for a controller configured to execute a program comprising a sequence of functions on an accelerator with a pipelined architecture comprising a microcode buffer, wherein the controller is programmable with the sequence of functions, wherein each function comprises a sequence of operations, and wherein each operation is represented by a template comprising a sequence of microcode instructions to be executed during a set of clock cycles for utilization of available resources in the accelerator. Thus, the controller method 100 may, for example, be performed by the arrangement 1100 and/or the controller 1110 of FIG. 11 and/or the processor 1220 of FIG. 12 and/or in the controller architecture 200 of FIG. 2; all of which will be described later herein.

The controller method 100 comprises the following steps being performed by the controller.

In step 101, a function of the program is executed as a sequence of operations, wherein the sequence of operations is represented by a sequence of templates comprising microcode instructions, wherein the microcode instructions specify addresses, registers, and timing requirements related to each operation in the sequence of operations.

Figure 2:
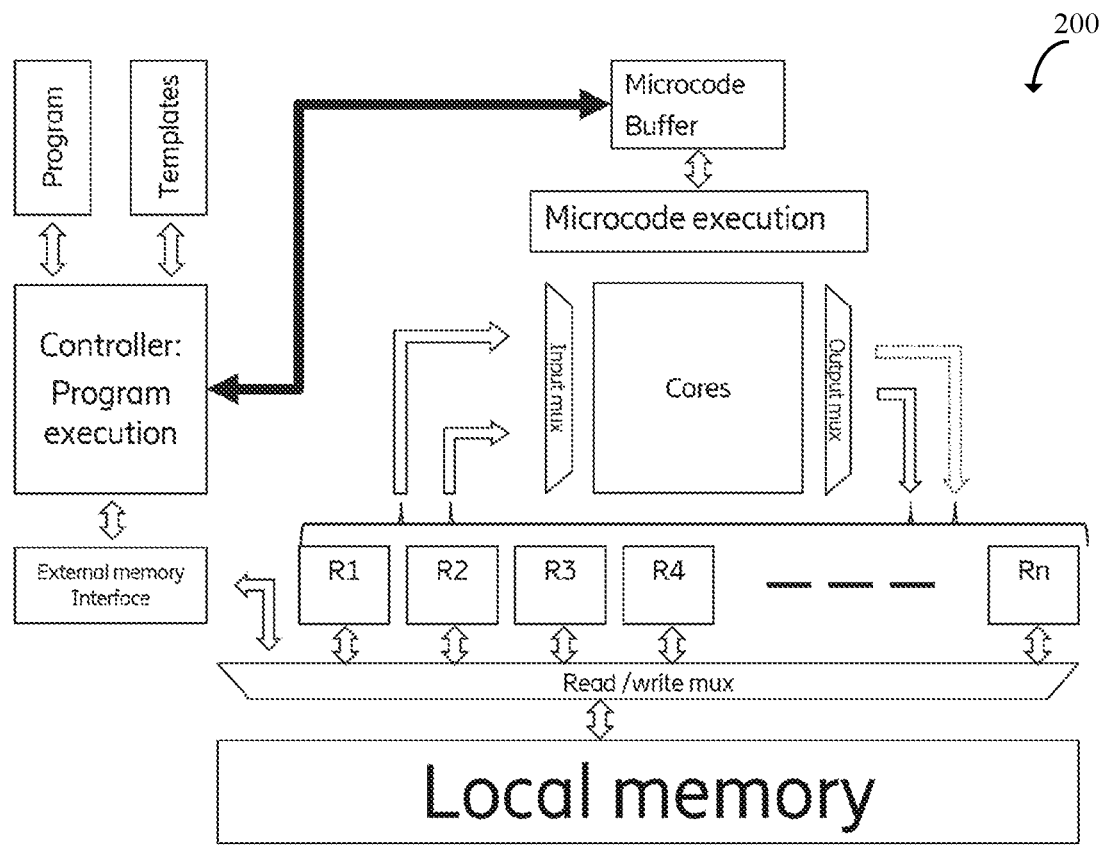
FIG. 2 is a schematic drawing illustrating an example architecture according to some embodiments.

For example, the controller is configured to be programmable with different sequences of operations and dimensions of the incoming data (reference to FIG. 2).

More specifically, the controller is configured to cause:
execution of the sent in program (a sequence of functions),
execution each function as a sequence of operations, and
execute each instruction per clock cycle.

In step 102, based on the microcode instructions in the template it is determined whether the template is non-colliding with previously inserted templates in the microcode buffer to solve resource dependencies.

For example, at the start of each clock cycle, the controller attempts to insert the next template instruction in the microcode buffer. The criteria for inserting is described below.

If the template fits into the microcode buffer, the full template instruction is inserted and the hardware executes the first row in the microcode buffer and shifts the microcode buffer up for the next clock cycle.

Figure 4:
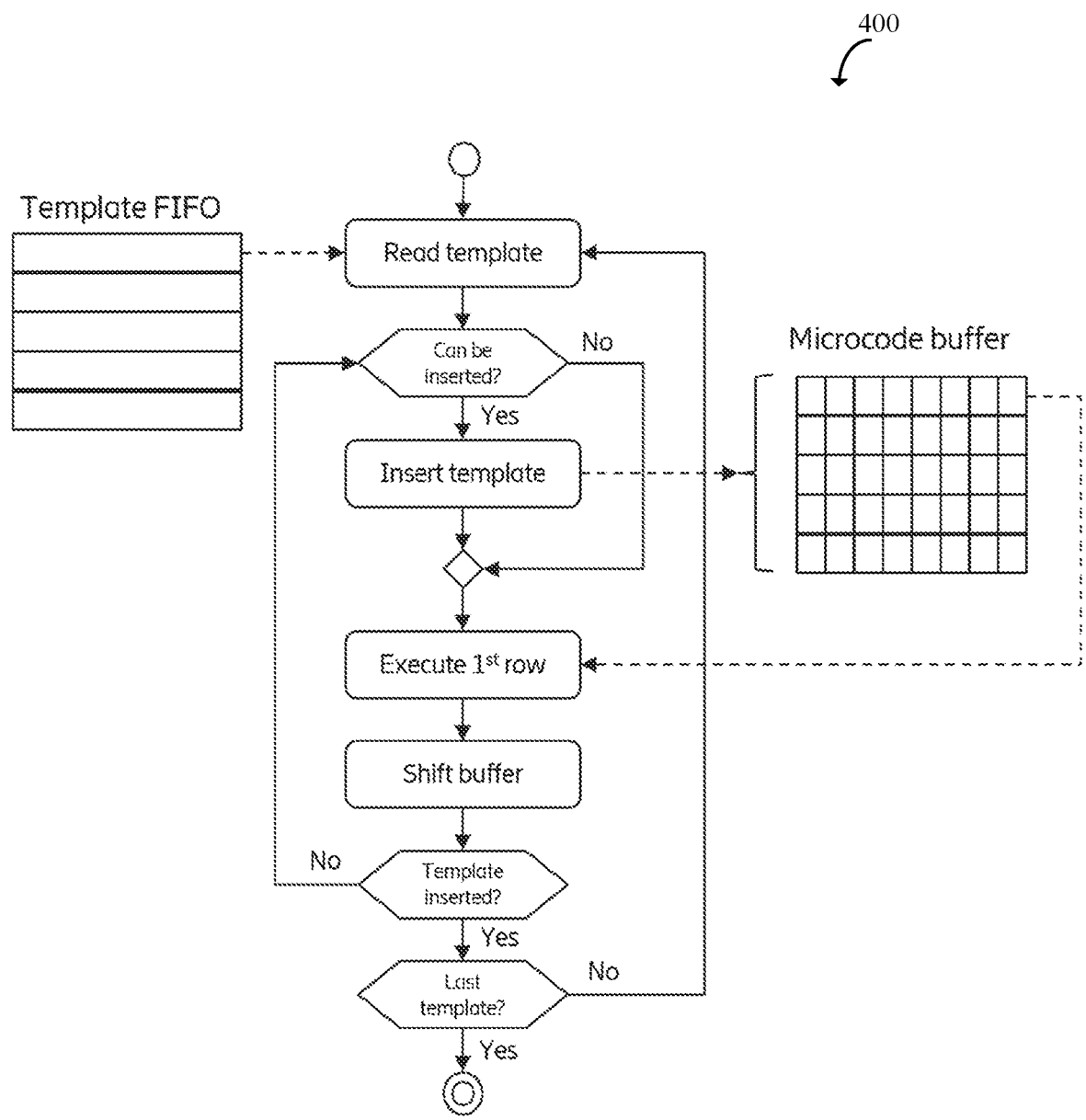
FIG. 4 is a flowchart illustrating example method steps according to some embodiments.

If the template does not fit into the microcode buffer, the first row is executed, and the microcode buffer is shifted up (reference to FIG. 4).

In step 103, based on the microcode instructions in the template specifying addresses it is determined whether data in local memory will be referenced before all previously inserted templates have taken effect to solve data dependencies.

For example, an additional test is done in the test for inserting the template in the buffer wherein the read addresses in the new template instruction are used to scan the microcode buffer for any writes to that address. If there is a write later, the template instruction cannot be inserted (reference to FIG. 6).

In step 104, based on the microcode instructions in the template specifying registers it is determined whether registers will be referenced before all previously inserted templates in the microcode buffer have taken effect to solve register dependencies.

For example, an additional test is done in the test for inserting the template in the buffer. The register write in the new template instruction is used to scan the microcode buffer for any reads of that register. If there is a read later, the template instruction cannot be inserted.

Figure 5:
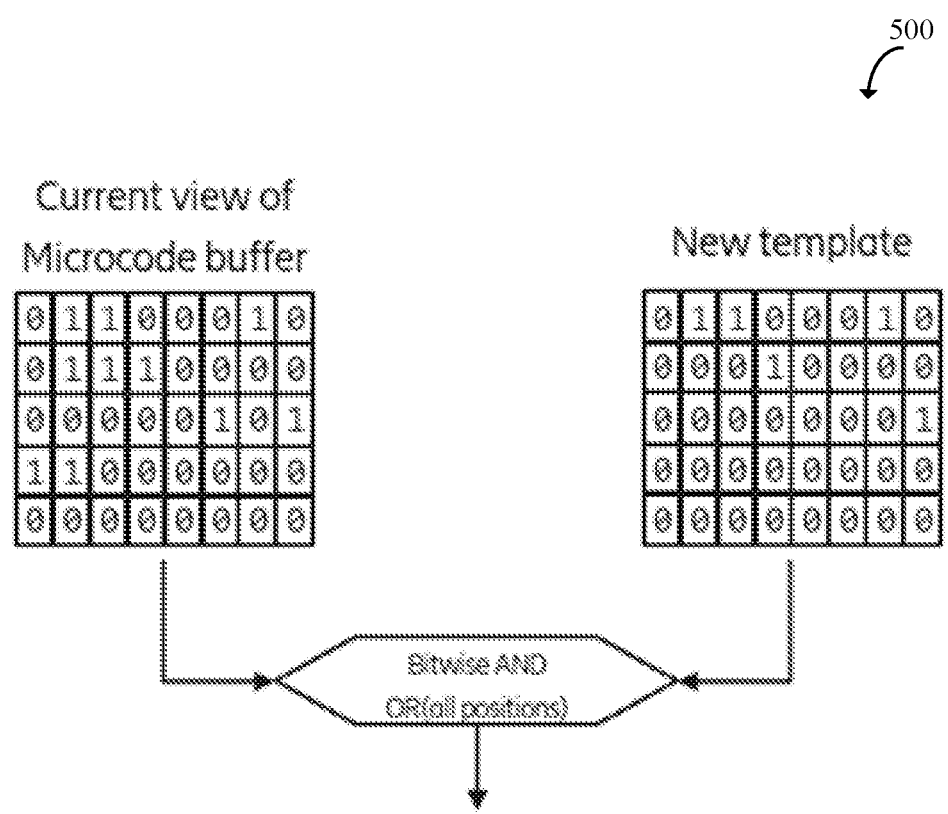
FIG. 5 is a schematic drawing illustrating example operations according to some embodiments.
Figure 6:
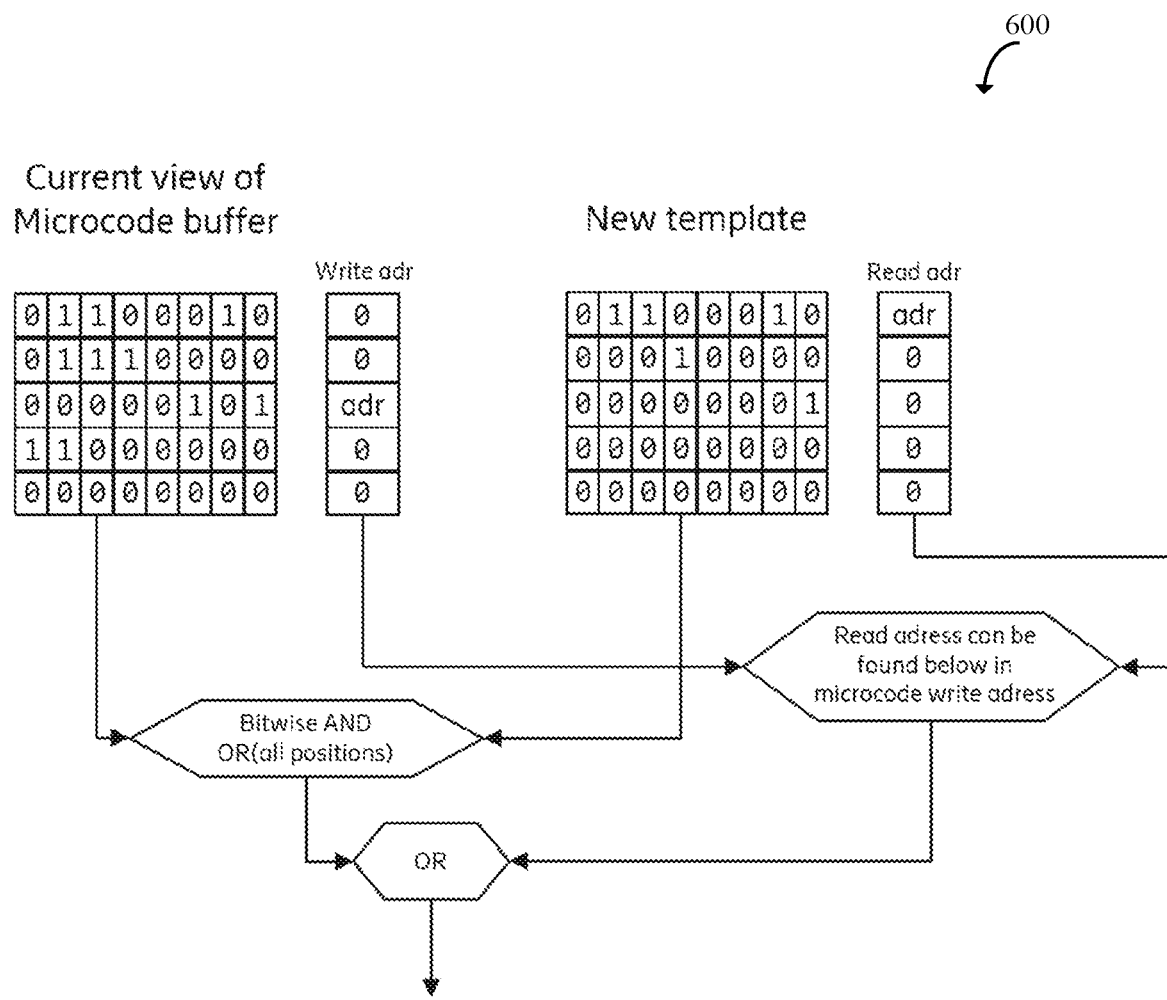
FIG. 6 is a schematic drawing illustrating example operations according to some embodiments.
Figure 7:
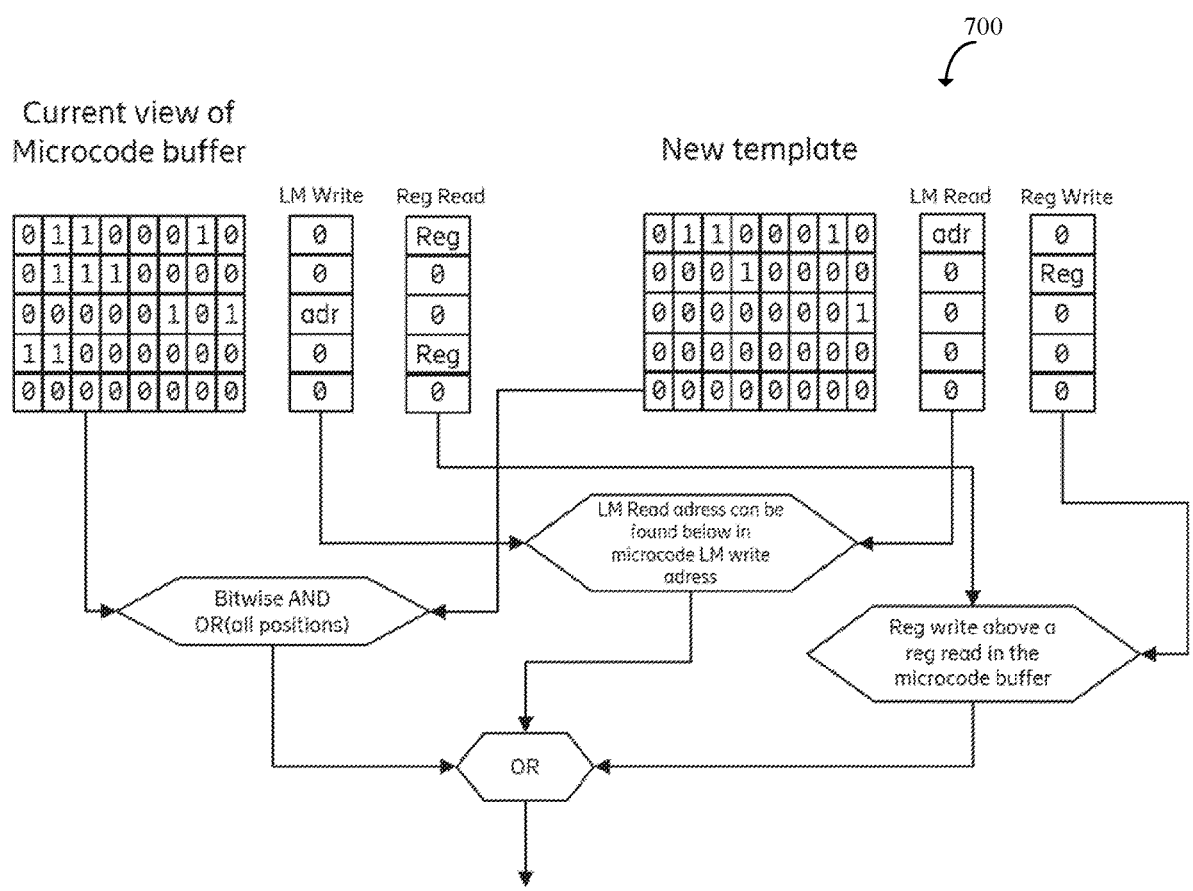
FIG. 7 is a schematic drawing illustrating example operations according to some embodiments.

Implementing the template insertion test as illustrated in FIGS. 5-7, the controller packs the microcode and there is no need to handle explicit wait/no-operation instructions (reference to FIG. 7).

In step 105, when the template fits; resources are available; local data memory accesses will not collide; and register accesses will not collide; it is determined to proceed to step 106 (YES-path out of step 105).

For example, when the dependencies in steps 102, 103, and 104 are solved then it is determined that the microcode instructions in the template may be created, in step 106.

In step 105, when the dependencies of steps 102, 103, and 104 are not solved (i.e., when the template does not fit and/or resources are not available and/or register accesses will collide), it is determined to return to step 102 for solving the dependencies (NO-path out of step 105).

In step 106, a sequence of microcode instructions is created in the template fulfilling the timing requirements on the fly.

Alternatively or additionally, the sequence of microcode instructions is created given the dependencies in the operations executed and there is no need to compile the program to a full microcode program.

Alternatively or additionally, the created sequence of microcode instructions is optimal given the dependencies in the operations executed.

In optional step 107, in some embodiments, the created sequence of templates is packed for utilization of available resources in the accelerator.

Alternatively or additionally, the packing of the created sequence of templates is optimal for to perform an operation.

In step 108, the template is inserted into the microcode buffer for execution of the created sequence of microcode instructions in the template, wherein the template comprises sequences of microcode instructions where each microcode instruction comprises instructions for one clock cycle.

Alternatively or additionally, as the microcode buffer is a limited size buffer for the microcode to execute, operations may be translated on the fly to microcode instructions in hardware, and yet the operations are fully programmable.

Alternatively or additionally, new templates or changes to existing templates may be added without any modification of the controller.

In optional step 109, in some embodiments, the microcode buffer is shifted up for a next clock cycle when a first instruction in the microcode buffer is sent to the accelerator.

In some embodiments, a depth of the microcode buffer is determined by the largest template size.

In some embodiments, the method further comprises queueing the templates for insertion into the microcode buffer until dependencies have been solved.

In some embodiments, the method further comprises selecting the templates depending on the operations to be executed.

In some embodiments, the sequence of operations comprises matrix operations.

In some embodiments, the accelerator comprises a matrix of processing elements wherein each processing element operates based on several data inputs and provides one data output in the result of the matrix.

In some embodiments, the accelerator is a hardware accelerator programmable with a sequence of operations.

In some embodiments, the hardware accelerator comprises a matrix accelerator which is programmable with a sequence of matrix operations.

In some embodiments, the matrix accelerator comprises a matrix of processing elements wherein each processing element further comprises a core of a set of multipliers followed by an adder tree and accumulator, and wherein the core is implemented as a pipeline.

In some embodiments, each step in the pipeline is performed during one clock cycle.

In some embodiments, the accelerator is for accelerating operations for weight calculation for beamforming in an advanced antenna system.

Any of the above steps for FIG. 1 may additionally have features identical with or corresponding to any of the various features as explained below for FIGS. 2-12.

Hence, in view of above method steps, utilization of available resources in the accelerator with a pipelined architecture comprising a microcode buffer is enabled.

FIG. 2 is a schematic drawing illustrating an example controller architecture 200 according to some embodiments. The controller architecture 200 is for a controller configured to execute a program comprising a sequence of functions on an accelerator with a pipelined architecture comprising a microcode buffer, wherein the controller is programmable with the sequence of functions, wherein each function comprises a sequence of operations, and wherein each operation is represented by a template comprising a sequence of microcode instructions to be executed during a set of clock cycles for utilization of available resources in the accelerator. Thus, the controller architecture 200 may, for example, be configured to perform one or more of the method steps of FIG. 1, FIGS. 4 and 8-10; all of which will be described later herein.

FIG. 2 illustrates the example controller architecture 200 with a hardware accelerator for matrix operations. The matrix accelerator may be programmed with a sequence of matrix operations, based on data read from the outside into a local data memory or on matrices generated inside the accelerator. The results may be written from local data memory to the outside.

The matrix operations may work on matrices of arbitrary size only limited by the size of local data memory. To make the processing more efficient and the utilization of the accelerator processing elements as high as possible the matrix example uses tile/block algorithms known from parallel computing research. With these types of tile/block algorithms, the matrices are split into a smaller size and to solve the larger operation the algorithms work on solving it for the block and the updating the rest of the full matrix and then iterate over all blocks. In FIG. 2 the block size is an 8×8 matrix.

A matrix operation may be described as:
Loops for covering the full size of the matrices and for the chosen algorithm,
Address generation (block addresses), and
Selection of a block function (depending on the algorithm).

The block function comprises a specific function that works on blocks of 8×8 matrices.

Examples of block functions:
Multiplying two 8×8 matrices: $A*B \rightarrow C$ (A, B and C are 8×8 matrices),
Inverting an 8×8 matrix: $A \rightarrow A^{-1}$,
Adding two 8×8 matrices: $A+B \rightarrow C$ (A, B and C are 8×8 matrices),
Cholesky factorization: $A \rightarrow L$ (A is an 8×8 matrix, L is the lower triangular), and
Update of a block: $C-A*B \rightarrow C$.

Figure 3:
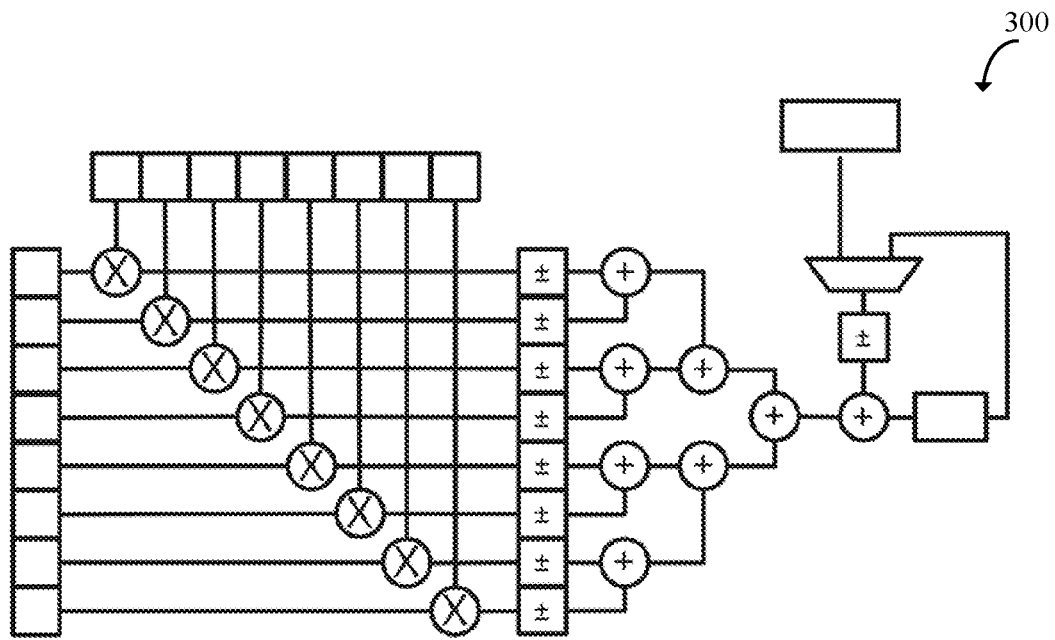
FIG. 3 is a schematic drawing illustrating an example architecture according to some embodiments.

The hardware accelerator in FIG. 2 illustrates the architecture of a hardware accelerator working on a block size of 8×8. It works on creating the output of an 8×8 block matrix in parallel, and thus has 64 processing elements that each work on one specific output in the 8×8 result. Each core (i.e. processing element) is built as illustrated in FIG. 3.

The controller is configured to minimize the execution times and yet be programmable with different sequences of operations and dimensions of the incoming data.

More specifically, the controller is configured to cause:
execution of the sent in program (a sequence of functions),
execution each function as a sequence of operations, and
execute each instruction per clock cycle.

In view of above, the controller should execute as efficient as possible, utilizing the hardware elements as much as possible The controller should furthermore be separated from the specific timings of the hardware pipeline.

FIG. 3 is a schematic drawing illustrating an example processing element 300 of an example controller architecture 200 according to some embodiments. The processing element 300 is for a controller configured to execute a program comprising a sequence of functions on an accelerator with a pipelined architecture comprising a microcode buffer, wherein the controller is programmable with the sequence of functions, wherein each function comprises a sequence of operations, and wherein each operation is represented by a template comprising a sequence of microcode instructions to be executed during a set of clock cycles for utilization of available resources in the accelerator. Thus, the processing element 300 may, for example, be configured to perform processing of one or more of the method steps of FIG. 1, FIGS. 4 and 8-10; all of which will be described later herein.

FIG. 3 illustrates a core (i.e., a processing element from the 64 processing elements as illustrated in FIG. 2), wherein the core comprises a set of multipliers followed by an adder tree and an accumulator. The core is furthermore implemented as a pipeline, wherein each step is one clock cycle, to maximize the utilization of each step.

By adding an input mux and an output mux, different operations may be implemented with these cores. The input mux selects data specific for an operation and the output mux select the output at different steps in the pipeline.

With the options to utilize the cores for different operations, the control of the pipeline will be timing dependent and different operations pick data at different stages in the pipeline as well as there can be settings that need to be timed to a specific stage related to the start.

To minimize the operation time and to fully utilize the cores (i.e., the processing elements as illustrated in FIG. 2), the different basic functions need to be packed. This means that the basic functions overlap each other utilizing the pipeline in the cores.

FIG. 4 is a flowchart illustrating method steps of an example controller method 400 according to some embodiments. The controller method 400 is for a controller configured to execute a program comprising a sequence of functions on an accelerator with a pipelined architecture comprising a microcode buffer, wherein the controller is programmable with the sequence of functions, wherein each function comprises a sequence of operations, and wherein each operation is represented by a template comprising a sequence of microcode instructions to be executed during a set of clock cycles for utilization of available resources in the accelerator.

Thus, the controller method 400 may, for example, be performed by the arrangement 1100 and/or the controller 1110 of FIG. 11 and/or the processor 1220 of FIG. 12 and/or in the controller architecture 200 of FIG. 2; all of which will be described later herein.

The operation, as described herein, typically comprises one instruction, even if it takes several microcode instructions to execute the operation on the hardware.

Each operation, as described herein, may be represented (e.g., described) separately in isolation as a sequence of microcode instructions to carry out the operation on the specific hardware with its specific timings.

The controller's task is to generate a sequence of operations to execute together with the addresses each operation should work on (compare with step 101 of FIG. 1).

A template comprises sequences of microcode instructions in rows, from top to bottom, wherein each row comprises instructions for one clock cycle. Each row in the template comprises, as described herein, a microcode instruction specific for a certain template, which can only be modified with the specific memory read and write addresses. The template instructions of the template are specific for the realization of the hardware and executing this template will execute the specific basic operation.

FIG. 4 illustrates inserting, by the controller, a template instruction in a microcode buffer comprising rows corresponding to the next coming microcode instructions (compare with step 102 of FIG. 1).

At the start of each clock cycle, the controller attempts to insert the next template instruction in the microcode buffer. The criteria for inserting is described below.

If the template fits into the microcode buffer, the full template instruction is inserted and the hardware executes the first row in the microcode buffer and shifts the microcode buffer up for the next clock cycle.

If the template does not fit into the microcode buffer, the first row is executed, and the microcode buffer is shifted up. This is in principle insertion of an implicit no-operation instruction.

FIG. 5 is a schematic drawing illustrating example controller operations according to some embodiments.

FIG. 5 illustrates determining if a template instruction fits into the microcode buffer and is not colliding with previous inserted instruction, i.e., resource dependencies (compare with step 102 of FIG. 1).

A binary view of the microcode buffer and the template instruction is created.

A "0" is inserted if the part of the microcode is not used and a "1" when its used.

A bitwise AND between the microcode buffer and the template instruction followed by an OR of all bits determine if it can be inserted or not.

A resulting "0" indicate that is can be inserted.

This approach solves pipeline dependencies or resources dependencies, i.e. if any stage collides in the pipeline. However, it does not solve any data dependencies, such as reading data from the internal memory before the previous instruction have written the data or if a register is overwritten before the previous instruction have used it. Hence, explicit wait instructions need to be inserted by the controller to wait for previous instructions.

FIG. 6 is a schematic drawing illustrating example controller operations according to some embodiments.

FIG. 6 illustrates additional logic needed to solve the reading of data from local memory before it has been written to memory by previous templates, i.e., data dependencies (compare with step 103 of FIG. 1).

An additional test is done in the test for inserting the template in the buffer.

The read addresses in the new template instruction are used to scan the microcode buffer for any writes to that address. If there is a write later, the template instruction cannot be inserted.

FIG. 7 is a schematic drawing illustrating example controller operations according to some embodiments.

FIG. 7 illustrates additional logic needed to solve the dependencies between the write of data to a register and the read of that register by previous template instructions, i.e. register dependencies.

An additional test is done in the test for inserting the template in the buffer.

The register write in the new template instruction is used to scan the microcode buffer for any reads of that register, i.e., register dependencies. If there is a read later, the template instruction cannot be inserted (compare with step 104 of FIG. 1).

Implementing the template insertion test as illustrated in FIGS. 5-7, the controller packs the microcode optimally and there is no need to handle explicit wait/no-operation instructions.

The three tests, as illustrated in FIGS. 5-7, may be done in parallel and combined in a final verdict.

The controller is separated from the specifics of the hardware accelerator and the timing of the pipeline, as it only handles basic operations and the corresponding template instruction.

The insertion is independent of the specific template, it only depends on if the insertion tests, as illustrated in FIGS. 5-7, pass or not.

The needed size (number of rows) of the microcode buffer is determined by the largest template instruction for the specific hardware accelerator, which in turns depends on the pipeline depth.

Figure 8:
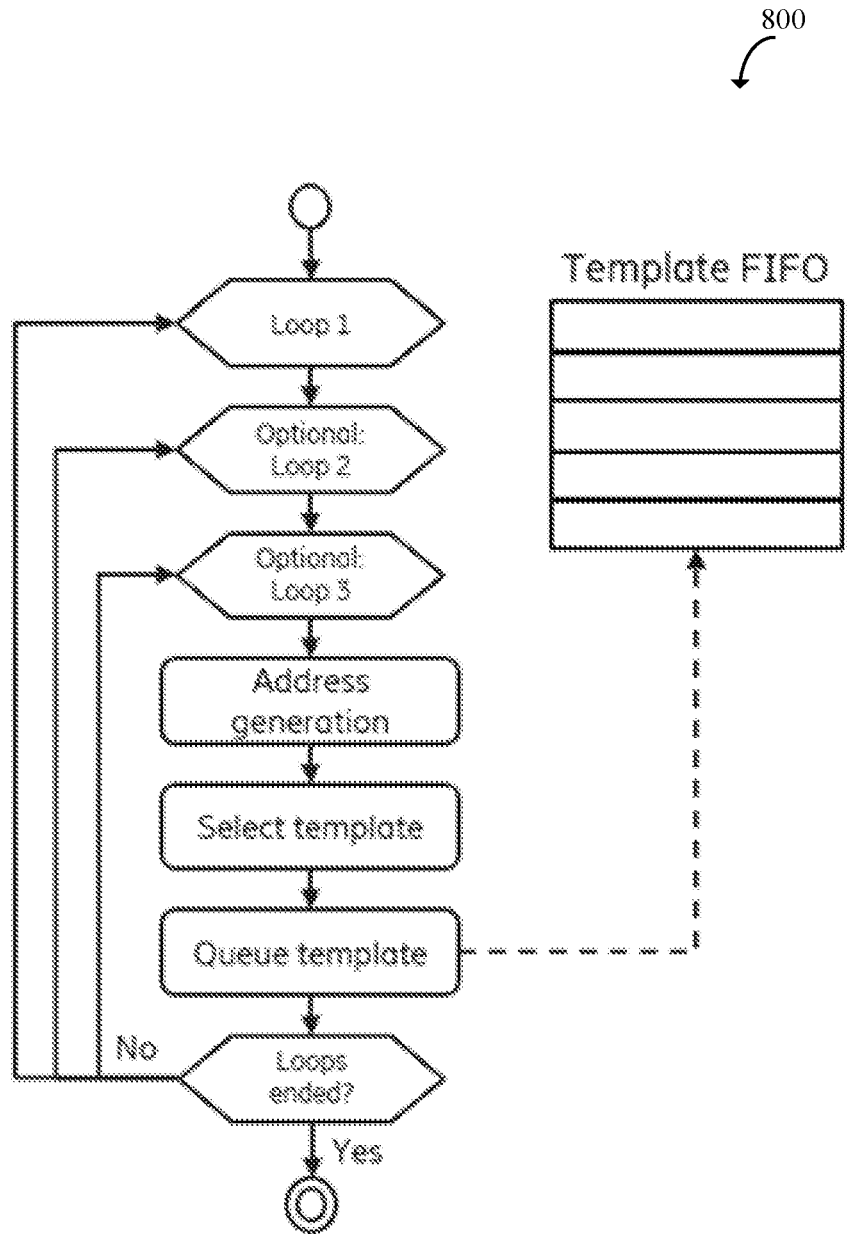
FIG. 8 is a flowchart illustrating example method steps according to some embodiments.

FIG. 8 is a flowchart illustrating method steps of an example controller method 800 according to some embodiments. The controller method 800 is for a controller configured to execute a program comprising a sequence of functions on an accelerator with a pipelined architecture comprising a microcode buffer, wherein the controller is programmable with the sequence of functions, wherein each function comprises a sequence of operations, and wherein each operation is represented by a template comprising a sequence of microcode instructions to be executed during a set of clock cycles for utilization of available resources in the accelerator. Thus, the controller method 800 may, for example, be performed by the arrangement 1100 and/or the controller 1110 of FIG. 11 and/or the processor 1220 of FIG. 12 and/or in the controller architecture 200 of FIG. 2; all of which will be described later herein.

FIG. 8 illustrates an example of the next level of control loop in the controller.

This level represents the function and implements the algorithm of the full function and breaks it down to a sequence of operations.

The operations are placed in a First In First Out (FIFO) that the lower control loop is handling, i.e. putting in the templates in the microcode buffer.

The execution of the operation is mainly to loop over the full problem by dividing it into a sequence of operations together with the correct addresses.

Figure 9:
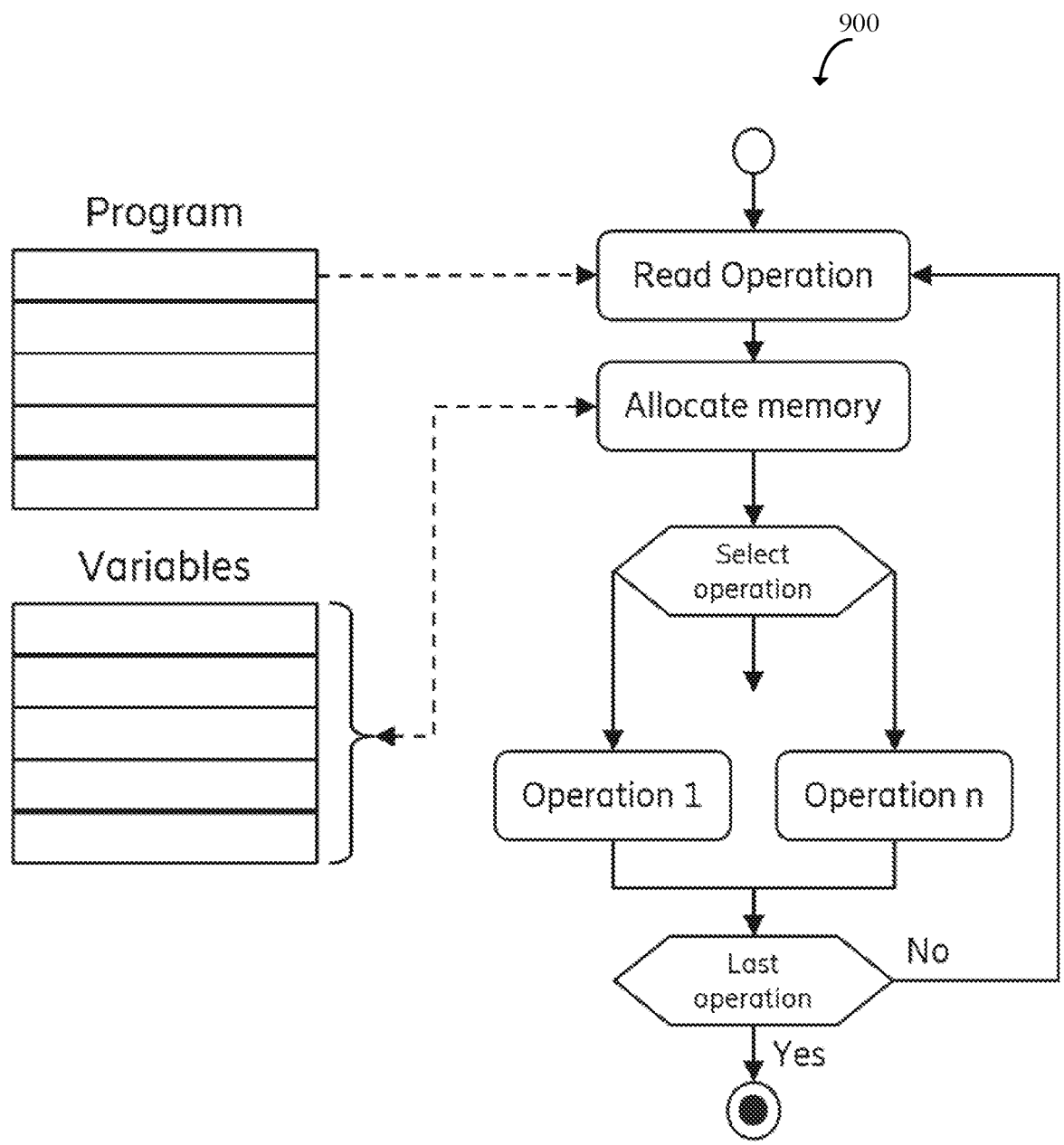
FIG. 9 is a flowchart illustrating example method steps according to some embodiments.

FIG. 9 is a flowchart illustrating method steps of an example controller method 900 according to some embodiments. The controller method 900 is for a controller configured to execute a program comprising a sequence of functions on an accelerator with a pipelined architecture comprising a microcode buffer, wherein the controller is programmable with the sequence of functions, wherein each function comprises a sequence of operations, and wherein each operation is represented by a template comprising a sequence of microcode instructions to be executed during a set of clock cycles for utilization of available resources in the accelerator. Thus, the controller method 900 may, for example, be performed by the arrangement 1100 and/or the controller 1110 of FIG. 11 and/or the processor 1220 of FIG. 12 and/or in the controller architecture 200 of FIG. 2; all of which will be described later herein.

FIG. 9 illustrates the program loop of the controller.

This level also handles the allocation of the variables in internal memory.

The program loop selects the operation based on the program and sorts out the right address in local memory that the operation should work on.

Figure 10:
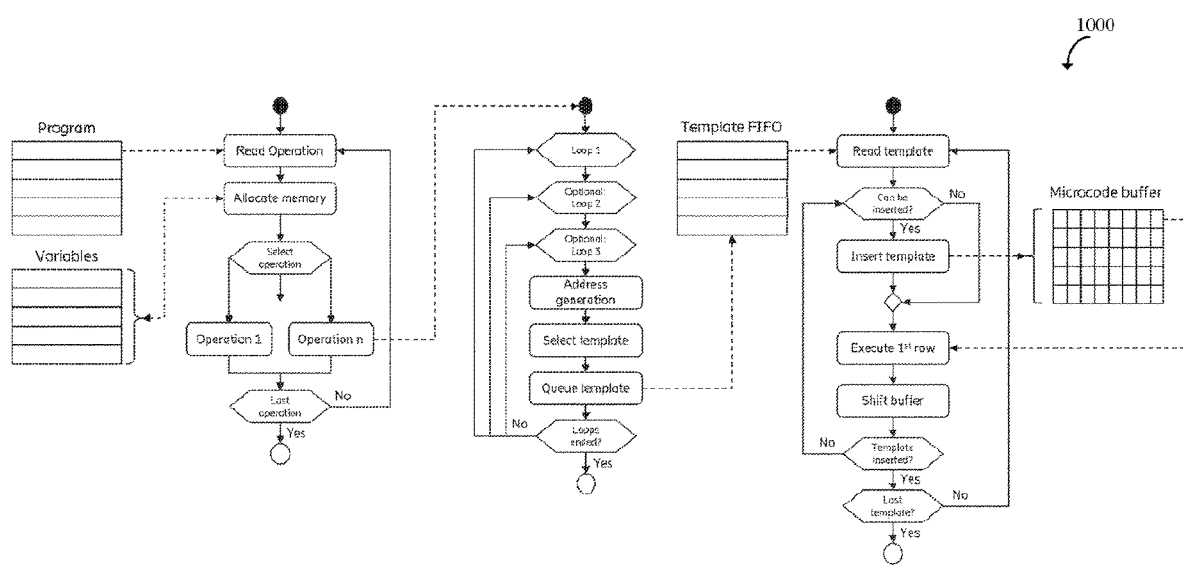
FIG. 10 is a flowchart illustrating example method steps according to some embodiments.

FIG. 10 is a flowchart illustrating method steps of an example controller method 1000 according to some embodiments. The controller method 1000 is for a controller configured to execute a program comprising a sequence of functions on an accelerator with a pipelined architecture comprising a microcode buffer, wherein the controller is programmable with the sequence of functions, wherein each function comprises a sequence of operations, and wherein each operation is represented by a template comprising a sequence of microcode instructions to be executed during a set of clock cycles for utilization of available resources in the accelerator. Thus, the controller method 1000 may, for example, be performed by the arrangement 1100 and/or the controller 1110 of FIG. 11 and/or the processor 1220 of FIG. 12 and/or in the controller architecture 200 of FIG. 2; all of which will be described later herein.

FIG. 10 illustrates all control loops from FIGS. 4, 8, and 9 in the same figure.

Figure 11:
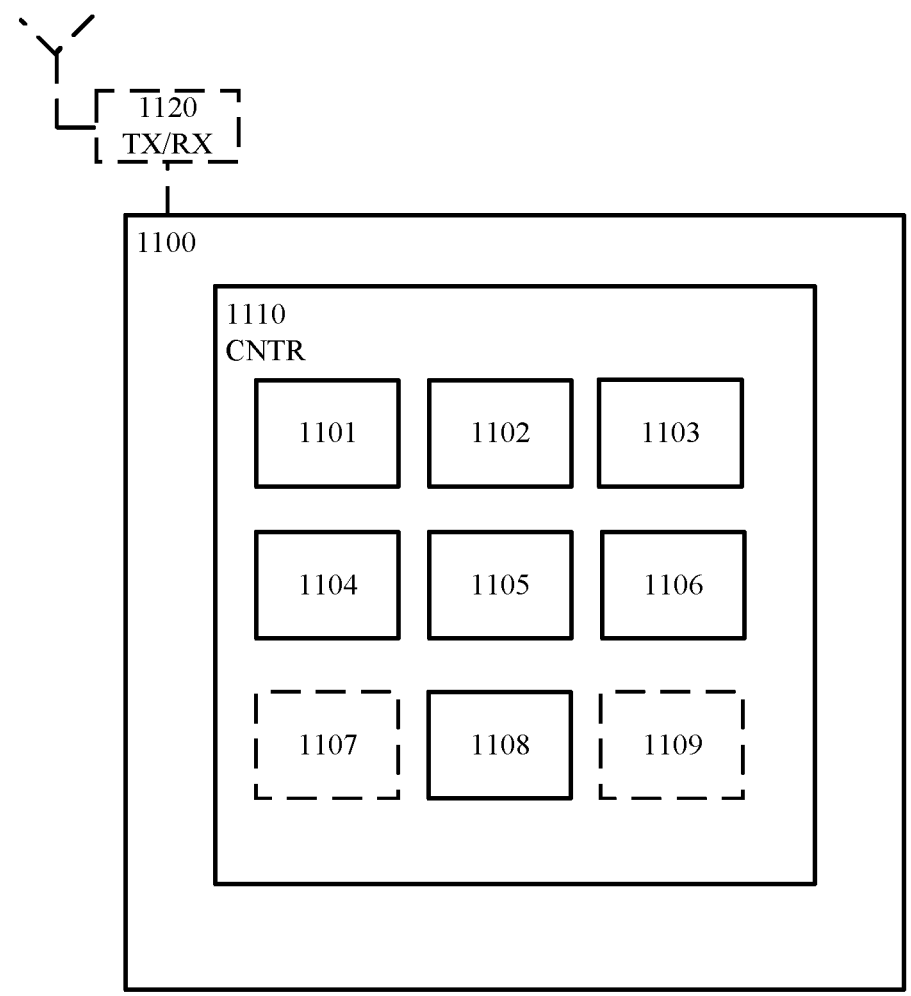
FIG. 11 is a schematic block diagram illustrating an example arrangement according to some embodiments.

FIG. 11 is a schematic block diagram illustrating an example controller arrangement 1100 according to some embodiments. The controller arrangement 1100 is for a controller configured to execute a program comprising a sequence of functions on an accelerator with a pipelined architecture comprising a microcode buffer, wherein the controller is programmable with the sequence of functions, wherein each function comprises a sequence of operations, and wherein each operation is represented by a template comprising a sequence of microcode instructions to be executed during a set of clock cycles for utilization of available resources in the accelerator. Thus, the controller arrangement 1100 and/or the controller 1110 may, for example, be configured to perform one or more of the method steps of FIG. 1, and/or one or more of any steps otherwise described herein.

The controller arrangement 1100 comprises a controller, e.g. device controlling circuitry, configured to cause execution of a function of the program as a sequence of operations, wherein the sequence of operations is represented by a sequence of templates comprising microcode instructions, wherein the microcode instructions specify addresses, registers, and timing requirements related to each operation in the sequence of operations.

The controller is further configured to cause determination of, based on the microcode instructions in the template, whether the template is non-colliding with previously inserted templates in the microcode buffer to solve resource dependencies; determination of, based on the microcode instructions in the template specifying addresses, whether data in local memory will be referenced before all previously inserted templates in the microcode buffer have taken effect to solve data dependencies; and determination of, based on the microcode instructions in the template specifying registers, whether registers will be referenced before all by previously inserted templates in the microcode buffer have taken effect to solve register dependencies.

The controller is furthermore configured to cause, when it is determined that the template fits, that resources are available, that local data memory accesses will not collide, and that register accesses will not collide, creation of a sequence of microcode instructions in the template fulfilling the timing requirements on the fly; and insertion of the template into the microcode buffer for execution of the created sequence of microcode instructions in the template, wherein the template comprises sequences of microcode instructions where each microcode instruction comprises instructions for one clock cycle.

The arrangement 1100 for a controller comprises, as mentioned above, the controller (CNTR; e.g., control circuitry or a controlling module) 1110, which may in turn comprise, (or be otherwise associated with; e.g., connected or connectable to), an executor 1101, e.g. executing circuitry or executing module, configured to execute a function of the program as a sequence of operations, wherein the sequence of operations is represented by a sequence of templates comprising microcode instructions, wherein the microcode instructions specify addresses, registers, and timing requirements related to each operation in the sequence of operations (compare with step 101 of FIG. 1).

The controller 1110 further comprises, (or is otherwise associated with; e.g., connected or connectable to), a determiner 1102, e.g. determining circuitry or determining module, configured to determine, based on the microcode instructions in the template, whether the template is non-colliding with previously inserted templates in the microcode buffer to solve resource dependencies (compare with step 102 of FIG. 1); a determiner 1103, e.g. determining circuitry or determining module, configured to determine based on the microcode instructions in the template specifying addresses, whether data in local memory will be referenced before all previously inserted templates in the microcode buffer have taken effect to solve data dependencies, (compare with step 103 of FIG. 1); and a determiner 1104, e.g. determining circuitry or determining module, configured to determine based on the microcode instructions in the template specifying registers, whether registers will be referenced before all by previously inserted templates in the microcode buffer have taken effect to solve register dependencies (compare with step 104 of FIG. 1).

The controller 1110 furthermore comprises, (or is otherwise associated with; e.g., connected or connectable to), a determiner 1105, e.g. determining circuitry or determining module, configured to determine when the template fits, that resources are available, that local data memory accesses will not collide, and that register accesses will not collide (compare with step 105 of FIG. 1), a creator 1106, e.g. creating circuitry or creating module, configured to create a sequence of microcode instructions in the template fulfilling the timing requirements on the fly (compare with step 106 of FIG. 1), and a inserter 1108, e.g. inserting circuitry or inserting module, configured to insert the template into the microcode buffer for execution of the created sequence of microcode instructions in the template, wherein the template comprises sequences of microcode instructions where each microcode instruction comprises instructions for one clock cycle (compare with step 108 of FIG. 1).

In some embodiments, the controller 1110 may further comprise, (or be otherwise associated with; e.g., connected or connectable to), a packer 1107, e.g. packing circuitry or packing module, configured to pack the created sequence of templates for utilization of available resources in the accelerator (compare with step 107 of FIG. 1).

In some embodiments, the controller 1110 may further comprise, (or be otherwise associated with; e.g., connected or connectable to), a shifter 1109, e.g. shifting circuitry or shifting module, configured to shift the microcode buffer up for a next clock cycle when a first instruction in the microcode buffer is sent to the accelerator (compare with step 109 of FIG. 1).

The arrangement 1100 may further comprise, (or be otherwise associated with; e.g., connected or connectable to), in some embodiments, a transceiver TX/RX 1120, e.g. transceiving circuitry or transceiving module, configured to transmit and receive radio signals e.g. in accordance with the weight calculated for beamforming.

Hence, in view of above arrangement, utilization of available resources in the accelerator with a pipelined architecture comprising a microcode buffer is enabled.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device.

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

According to some embodiments, a computer program product comprises a computer readable medium such as, for example a universal serial bus (USB) memory, a plug-in card, an embedded drive or a read only memory (ROM).

Figure 12:
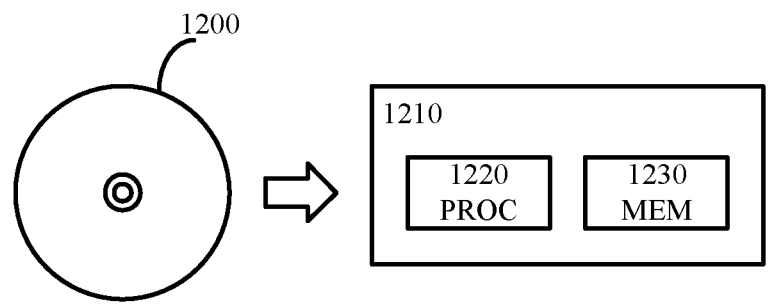
FIG. 12 is a schematic drawing illustrating an example computer readable medium according to some embodiments.

FIG. 12 illustrates an example computer readable medium in the form of a compact disc (CD) ROM 1200. The computer readable medium has stored thereon a computer program comprising program instructions. The computer program is loadable into a data processor (PROC) 1220, which may, for example, be comprised in a wireless communication device 510. When loaded into the data processor, the computer program may be stored in a memory (MEM) 1230 associated with or comprised in the data processor.

In some embodiments, the computer program may, when loaded into and run by the data processing unit, cause execution of method steps according to, for example, FIG. 1, FIGS. 4 and 8-10, and/or one or more of any steps otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims.

Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method performed by a controller to execute a program comprising a sequence of functions on an accelerator with a pipelined architecture comprising a microcode buffer, wherein the controller is programmable with the sequence of functions, wherein each function comprises a sequence of operations, and wherein each operation is represented by a template comprising a sequence of microcode instructions to be executed during a set of clock cycles for utilization of available resources in the accelerator, the method comprising:
 executing a function of the program as a sequence of operations, wherein the sequence of operations is represented by a sequence of templates comprising microcode instructions, wherein the microcode instructions specify addresses, registers, and timing requirements related to each operation in the sequence of operations,
 determining, based on the microcode instructions in the template, whether the template is non-colliding with previously inserted templates in the microcode buffer to solve resource dependencies,
 determining, based on the microcode instructions in the template specifying addresses, whether data in local memory will be referenced before all previously inserted templates have taken effect to solve data dependencies,
 determining, based on the microcode instructions in the template specifying registers, whether registers will be referenced before all previously inserted templates in the microcode buffer have taken effect to solve register dependencies,
 when it is determined that the template fits, that resources are available, that local data memory accesses will not collide, and that register accesses will not collide:
  creating a sequence of microcode instructions in the template fulfilling the timing requirements on the fly, and
  inserting the template into the microcode buffer for execution of the created sequence of microcode instructions in the template, wherein the template comprises sequences of microcode instructions where each microcode instruction comprises instructions for one clock cycle.

2. The method according to claim 1, further comprising a following operation being performed by the controller:
 packing the created sequence of templates for utilization of available resources in the accelerator.

3. The method according to claim 1, further comprising a following operation being performed by the controller:
 shifting the microcode buffer up for a next clock cycle when a first instruction in the microcode buffer is sent to the accelerator.

4. The method according to claim 1, wherein a depth of the microcode buffer is determined by the largest template size.

5. The method according to claim 1, further comprising queueing the templates for insertion into the microcode buffer until dependencies have been solved.

6. The method according to claim 1, further comprising selecting the templates depending on the operations to be executed.

7. The method according to claim 1, wherein the sequence of operations comprises matrix operations.

8. The method according to claim 1, wherein the accelerator comprises a matrix of processing elements wherein each processing element operates based on several data inputs and provides one data output in a result of the matrix.

9. The method according to claim 1, wherein the accelerator is a hardware accelerator programmable with a sequence of operations.

10. The method according to claim 9, wherein the hardware accelerator comprises a matrix accelerator which is programmable with a sequence of matrix operations.

11. The method according to claim 10, wherein the matrix accelerator comprises a matrix of processing elements wherein each processing element further comprises a core of a set of multipliers followed by an adder tree and accumulator, and wherein the core is implemented as a pipeline.

12. The method according to claim 11, wherein each operation in the pipeline is performed during one clock cycle.

13. The method according to claim 1, wherein the accelerator is for accelerating operations for weight calculation for beamforming in an advanced antenna system.

14. A non-transitory computer readable storage medium, having thereon a computer program comprising program instructions which, when executed by a processing unit, cause a controller to execute a program comprising a sequence of functions on an accelerator with a pipelined architecture comprising a microcode buffer, wherein each function comprises a sequence of operations and wherein each operation is represented by a template comprising a sequence of microcode instructions to be executed during a set of clock cycles for utilization of available resources in the accelerator by performing operations comprising:
 executing a function of the program as a sequence of operations, wherein the sequence of operations is represented by a sequence of templates comprising microcode instructions, wherein the microcode instructions specify addresses, registers, and timing requirements related to each operation in the sequence of operations,
 determining, based on the microcode instructions in the template, whether the template is non-colliding with previously inserted templates in the microcode buffer to solve resource dependencies,
 determining, based on the microcode instructions in the template specifying addresses, whether data in local memory will be referenced before all previously inserted templates have taken effect to solve data dependencies,
 determining, based on the microcode instructions in the template specifying registers, whether registers will be referenced before all previously inserted templates in the microcode buffer have taken effect to solve register dependencies,
 when it is determined that the template fits, that resources are available, that local data memory accesses will not collide, and that register accesses will not collide:
  creating a sequence of microcode instructions in the template fulfilling the timing requirements on the fly, and inserting the template into the microcode buffer for execution of the created sequence of microcode instructions in the template, wherein the template comprises sequences of microcode instructions where each microcode instruction comprises instructions for one clock cycle.

15. A controller to execute a program comprising a sequence of functions on an accelerator with a pipelined architecture comprising a microcode buffer, wherein the controller is programmable with the sequence of functions, wherein each function comprises a sequence of operations, and wherein each operation is represented by a template comprising a sequence of microcode instructions to be executed during a set of clock cycles for utilization of available resources in the accelerator, the controller to:

execute a function of the program as a sequence of operations, wherein the sequence of operations is represented by a sequence of templates comprising microcode instructions, wherein the microcode instructions specify addresses, registers, and timing requirements related to each operation in the sequence of operations, determine, based on the microcode instructions in the template, whether the template is non-colliding with previously inserted templates in the microcode buffer to solve resource dependencies, determine, based on the microcode instructions in the template specifying addresses, whether data in local memory will be referenced before all previously inserted templates in the microcode buffer have taken effect to solve data dependencies, determine, based on the microcode instructions in the template specifying registers, whether registers will be referenced before all by previously inserted templates in the microcode buffer have taken effect to solve register dependencies, responsive to determination that the template fits, that resources are available, that local data memory accesses will not collide, and that register accesses will not collide:

create a sequence of microcode instructions in the template fulfilling the timing requirements on the fly, and insert the template into the microcode buffer for execution of the created sequence of microcode instructions in the template, wherein the template comprises sequences of microcode instructions where each microcode instruction comprises instructions for one clock cycle.

16. The controller according to claim 15, wherein the controller is further to:

shift the microcode buffer up for a next clock cycle when a first instruction in the microcode buffer is sent to the accelerator.

17. The controller according to claim 15, wherein the controller is further to queue the templates for insertion into the microcode buffer until dependencies have been solved.

18. The controller according to claim 15, wherein the controller is further to select the templates depending on the operations to be executed.

19. The controller of claim 15, wherein the accelerator is implemented as a hardware accelerator with the pipelined architecture comprising the microcode buffer.

20. The controller of claim 15, wherein the accelerator is implemented as a hardware accelerator within a controller system architecture.

* * * * *